United States Patent
Mondello et al.

(10) Patent No.: US 10,296,421 B2
(45) Date of Patent: May 21, 2019

(54) MEMORY DEVICES AND SYSTEMS WITH SECURITY CAPABILITIES

(71) Applicant: Micron Technology, Inc., Boise, ID (US)

(72) Inventors: Antonino Mondello, Messina (IT); Lance Dover, Fair Oaks, CA (US); Fabio Indelicato, Aci Sant' Antonio (IT)

(73) Assignee: Micron Technology, Inc., Boise, ID (US)

( * ) Notice: Subject to any disclaimer, the term of this patent is extended or adjusted under 35 U.S.C. 154(b) by 11 days.

(21) Appl. No.: 15/632,907

(22) Filed: Jun. 26, 2017

(65) Prior Publication Data

US 2018/0373598 A1 Dec. 27, 2018

(51) Int. Cl.
*G06F 12/00* (2006.01)
*G06F 13/00* (2006.01)
*G06F 13/28* (2006.01)
*G06F 11/14* (2006.01)
*G06F 21/57* (2013.01)
*G06F 21/50* (2013.01)

(52) U.S. Cl.
CPC ...... *G06F 11/1458* (2013.01); *G06F 11/1461* (2013.01); *G06F 21/57* (2013.01); *G06F 11/1446* (2013.01); *G06F 21/50* (2013.01)

(58) Field of Classification Search
CPC .................. G06F 11/1458; G06F 17/30109
USPC .......................................................... 711/161
See application file for complete search history.

(56) References Cited

U.S. PATENT DOCUMENTS

| | | | | |
|---|---|---|---|---|
| 2003/0115461 A1* | 6/2003 | O'Neill | ................... | G06F 21/57 713/170 |
| 2009/0144582 A1* | 6/2009 | Li | .......................... | G06F 21/575 714/6.3 |
| 2010/0146231 A1* | 6/2010 | Gopalan | ............. | G06F 11/1458 711/162 |
| 2015/0019793 A1* | 1/2015 | Dover | ..................... | G06F 21/57 711/103 |

\* cited by examiner

*Primary Examiner* — Edward J Dudek, Jr.
*Assistant Examiner* — Sidney Li
(74) *Attorney, Agent, or Firm* — Perkins Coie LLP

(57) ABSTRACT

Several embodiments of systems incorporating memory devices are disclosed herein. In one embodiment, a memory device can include a controller, a main memory operably coupled to the controller, and security hardware operably coupled to the controller and to the main memory. The main memory can include a plurality of memory regions and at least one reserved memory region configured to store genuine backups of memory content stored in the plurality of memory regions. In operation, the security hardware is configured to measure memory content of the plurality of memory regions before startup, shutdown, and reset of the memory device; compare the measured value to an expected value; and direct the controller to replace the memory content with a genuine backup of the memory content stored in the at least one reserved memory region if the measured value and the expected value are not in accord.

12 Claims, 3 Drawing Sheets

MEMORY DEVICES AND SYSTEMS WITH SECURITY CAPABILITIES

TECHNICAL FIELD

The present disclosure is related to memory devices and systems. In particular, the present disclosure is related to nonvolatile memory having security hardware capable of verifying the genuineness of its memory content.

BACKGROUND

Upon system boot, reset, and shutdown, a computer system executes one or more routines to self-test, identify, initialize, and/or disable devices, memory, and other components of the system. Computer systems typically store these routines in nonvolatile memory and implicitly trust their genuineness. As a result, corrupted routines, such as those created by malicious programmers, can exploit this trust to corrupt the computer system.

To identify corrupted routines before they affect the computer system, several systems include a dedicated microprocessor (e.g., a secured cryptoprocessor) to authenticate (e.g., using cryptographic keys) system hardware devices, memory, and other components and their corresponding routines before allowing them to communicate and interact with the remainder of the computer system. The dedicated microprocessor may perform this authentication for several hardware devices, memory, and other components across the computer system. Thus, the dedicated microprocessor must use the computer system bus to send and receive authentication data. This opens the computer system up to "man in the middle" or "bus sniffing" attacks, wherein the valid authentication data could be read from the system bus, altered, and/or replaced with falsified data.

DETAILED DESCRIPTION

Figure 1:
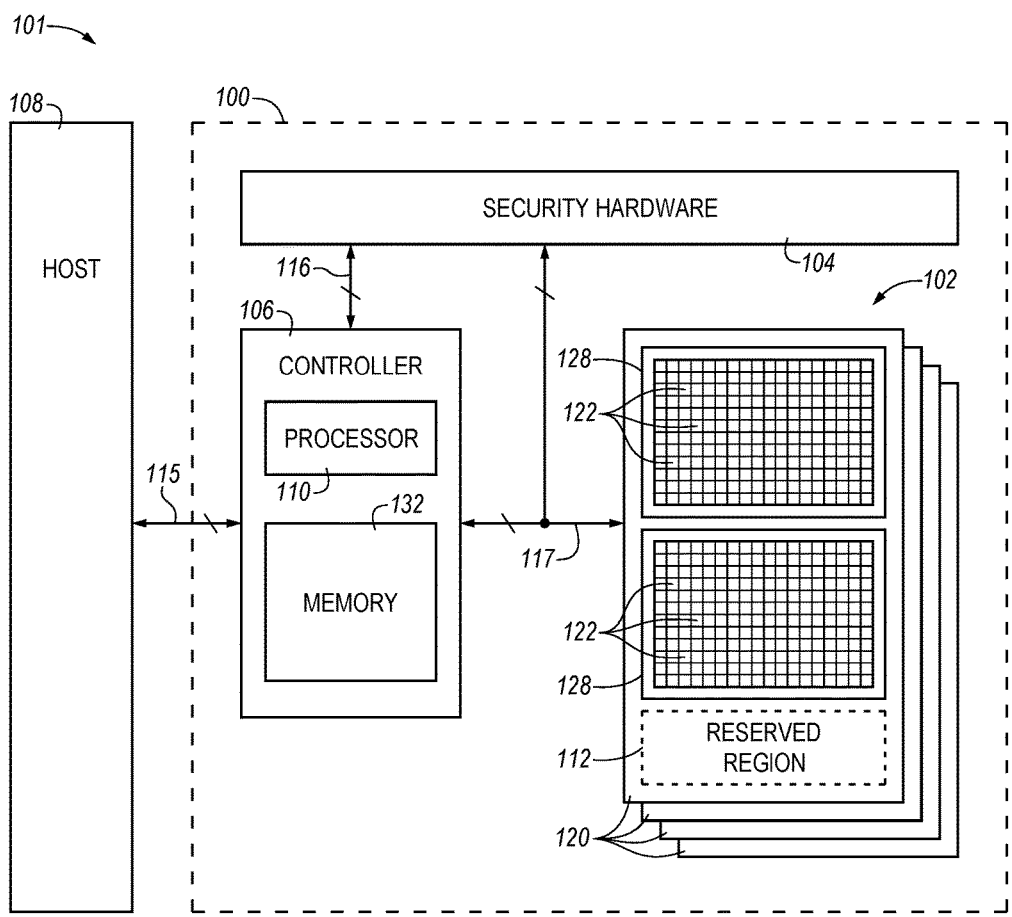
FIG. 1 is a block diagram of a system having a memory device configured in accordance with an embodiment of the present technology.

As discussed in greater detail below, the technology disclosed herein relates to nonvolatile memory configured to verify the genuineness of its memory content. A person skilled in the art, however, will understand that the technology may have additional embodiments and that the technology may be practiced without several of the details of the embodiments described below with reference to FIGS. 1-3. In the illustrated embodiments below, the memory devices are primarily described in the context of devices incorporating NAND-based storage media (e.g., NAND flash). Memory devices configured in accordance with other embodiments of the present technology, however, can include other types of memory devices (e.g., 3D-NAND, phase change memory, ferroelectric, etc.) and/or can include main memories that are not NAND-based (e.g., NOR-based) or only partially NAND-based.

In conventional computer systems, a central processing unit (CPU) controls operations of the various components of the system, including its nonvolatile memory. When the system is powered on, powered off, or reset the CPU executes one or more routines stored in the nonvolatile memory. In some instances, these routines can instruct the CPU and/or a dedicated microprocessor to carry out an authentication procedure to reduce the likelihood that the CPU will execute malicious, defective, or otherwise corrupted code. As part of the authentication procedure, these routines can instruct the CPU and/or the dedicated microprocessor to take a measurement of the contents of all or a subset of the memory content of the nonvolatile memory device to compare this measurement with an expected value. In this manner, the CPU and/or the dedicated microprocessor can determine whether or not to trust the memory content based on whether the measurement and the expected value accord with one another. However, simply because the CPU and/or the dedicated microprocessor executes the authentication procedure does not mean that the routines are necessarily trustworthy. For example, one or more of the routines can be corrupted such that it instructs or causes the CPU and/or the dedicated microprocessor to bypass the authentication procedure altogether. Similarly, as discussed above, because the CPU and the dedicated microprocessor use the system bus to send and receive authentication data, the authentication procedures can be circumvented and/or otherwise thwarted by "man in the middle" or "bus sniffing" attacks. Nonvolatile memory configured in accordance with several embodiments of the present technology, however, address these and other limitations of conventional computer systems.

One embodiment of the present technology is a memory device comprising a controller, security hardware, and a main memory. The main memory includes a plurality of memory regions and at least one reserved memory region. The security hardware and/or the controller are configured to (1) take a measurement of memory content stored in the plurality of memory regions to obtain a measured value, (2) compare the measured value to an expected value, and (3) replace the memory content with a genuine backup of the memory content stored in the at least one reserved memory region if the measured value and the expected value are not in accord.

Incorporating security functionality into the memory device provides several advantages over conventional computer systems. First, embedding security hardware into the memory device that is capable of internally performing memory content measurements and internally evaluating the genuineness of the memory content avoids the transmission of authentication data over the system bus. This reduces the likelihood that the computer system will be compromised by "man in the middle" or "bus sniffing" attacks. Second, system board design efforts and costs are reduced by embedding security facilities in a device that is already part of the system board and reducing the bill of materials (BOM) of the board. Third, embedding security facilities in the memory device reduces the workload of the host device controller and the system bus. Fourth, providing the memory device with dedicated security hardware increases the speed and performance of the computer system, as hardware implementation of cryptographic functions can be one or more orders of magnitude (e.g., 10 to 100 times) faster than software implementation thereof.

FIG. 1 is a block diagram of a system 101 having a memory device 100 configured in accordance with an embodiment of the present technology. As shown, the memory device 100 includes a main memory 102 and a controller 106 operably coupling the main memory 102 to a host device 108 (e.g., an upstream central processor (CPU)). The memory device 100 further includes security hardware 104 operably coupled to the controller 106 and to the main memory 102 via security data bus 116 and memory data bus 117, respectively. The main memory 102 includes a plurality of memory regions, or memory units 120, which include a plurality of memory cells 122. Memory units 120 can be individual memory dies, memory planes in a single memory die, a stack of memory dies vertically connected with through-silicon vias (TSVs), or the like. In one embodiment, each of the memory units 120 can be formed from a semiconductor die and arranged with other memory unit dies in a single device package (not shown). In other embodiments, one or more of the memory units 120 can be co-located on a single die and/or distributed across multiple device packages. The memory cells 122 can include, for example, NAND flash and/or other suitable storage elements (e.g., NOR flash, read only memory (ROM), electrically erasable programmable ROM EEPROM, erasable programmable ROM (EPROM), ferroelectric, magnetoresistive, phase change memory, etc.) configured to store data persistently or semi-persistently. The main memory 102 and/or the individual memory units 120 can also include other circuit components (not shown) (e.g., memory subsystems), such as multiplexers, decoders, buffers, read/write drivers, address registers, data out/data in registers, etc., for accessing and/or programming (e.g., writing) the memory cells 122 and other functionality, such as for processing information and/or communicating with the controller 106.

As shown in the illustrated embodiment, the main memory 102 further includes a reserved memory region 112. In some embodiments, the reserved memory region 112 can be located on the same memory die as an individual memory unit 120. In other embodiments and similar to the memory units 120, the reserved memory region 112 can be an individual memory die; memory planes in a single memory die; a stack of memory dies vertically connected with TSVs, or the like; formed from a semiconductor die and arranged with other reserved memory regions in a single device package (not shown); and/or distributed across multiple device packages. In these and still other embodiments, the reserved memory region 112 may correspond to a single memory unit 120 or to multiple memory units, including memory units on different die. The reserved memory region 112 can include a plurality of NAND-based memory cells, such as the memory cells 122. In other embodiments, the reserved memory region 112 can include NOR-based, read only, or other suitable memory cells that differ from the memory cells 122. As discussed in greater detail below, the restricted memory region 112 stores backups of genuine routines, firmware, and/or other data of the memory device 100 (e.g., of the memory units 120) and/or of the system 101. For this reason, the address of the reserved memory region 112, in some embodiments, can be restricted or otherwise hidden from the controller 106 and/or from the host device 108. In these and other embodiments, the address of the reserved memory region 112 can be accessed only when the memory device 100 (e.g., the security hardware 104 and/or the controller 106) determines one or more routines, firmware, and/or other data has been unexpectedly modified and/or otherwise corrupted. In these and still other embodiments, the addressing scheme for reading from and/or programming (e.g., writing) to the reserved memory region 112 can be different than the addressing scheme for reading from and/or programming to other memory regions within the main memory 102. Thus, in these embodiments, only hardware components (e.g., the security hardware 104 and/or the controller 106) capable of accommodating the different addressing scheme of the reserved memory region 112 are capable of reading from and/or programming to the reserved memory region 112.

The controller 106 can be a microcontroller, special purpose logic circuitry (e.g., a field programmable gate array (FPGA), an application specific integrated circuit (ASIC), etc.), or other suitable processor. The controller 106 can include a processor 110 configured to execute instructions stored in memory. In the illustrated example, the memory of the controller 106 includes an embedded memory 132 configured to store various processes, logic flows, and routines for controlling operation of the memory device 100, including managing the main memory 102 and handling communications between the memory device 100 and the host device 108. In some embodiments, the embedded memory 132 can include memory registers storing, e.g., memory pointers, fetched data, etc. The embedded memory 132 can also include read-only memory (ROM) for storing micro-code. In operation, the controller 106 can directly read, write, or otherwise program (e.g., erase) the various memory regions of the main memory 102, such as by reading from and/or writing to groups of memory cells 122 (e.g., memory pages and/or memory blocks 128).

The controller 106 communicates with the host device 108 over a system bus 115. In some embodiments, the host device 108 and the controller 106 can communicate over a serial interface, such as a serial attached SCSI (SAS), a serial AT attachment (SATA) interface, a peripheral component interconnect express (PCIe), or other suitable interface (e.g., a parallel interface). The host device 108 can send various requests (in the form of, e.g., a packet or stream of packets) to the controller 106. A request can include a command to write, erase, return information, and/or to perform a particular operation (e.g., a TRIM operation).

The security hardware 104 can include components necessary to perform internal memory content measurements (e.g., without using the system bus 115) and/or to cryptographically sign messages sent to the host device 108. For example, the security hardware 104 can include a secure hash algorithm engine to perform secure hash algorithms (SHAs) (e.g., SHA-2) and/or other hash calculations (e.g., using hash-based message authentication code (HMAC)). Furthermore, the security hardware 104 can include one or more security registers to store volatile parameters (e.g., customer secret keys, unique device identifiers (UIDs), golden measurements of the memory array, etc.) and/or nonvolatile parameters (e.g., session keys). The security hardware 104 can also include nonvolatile monotonic counters to implement secure commands and to provide data exchange protection between the memory device 100 and the host device 108 (e.g., by guaranteeing anti-replay strength). Therefore, in the embodiment illustrated in FIG. 1, the memory device 100 is capable of implementing the trusted platform module (TPM) specification of the Trusted Computing Group®. In another embodiment, the memory device 100 can operate based on proprietary, application specific, or other suitable procedures. For example, the security hardware 104 can be suited for mobile devices in general or for a particular mobile device type or device manufacturer. Although shown as stand-alone hardware in the embodiment illustrated schematically in FIG. 1, the security hardware 104 (e.g., in part or in entirety) can be embedded into the controller 106 and/or into the main memory 102 in other embodiments.

Figure 2:
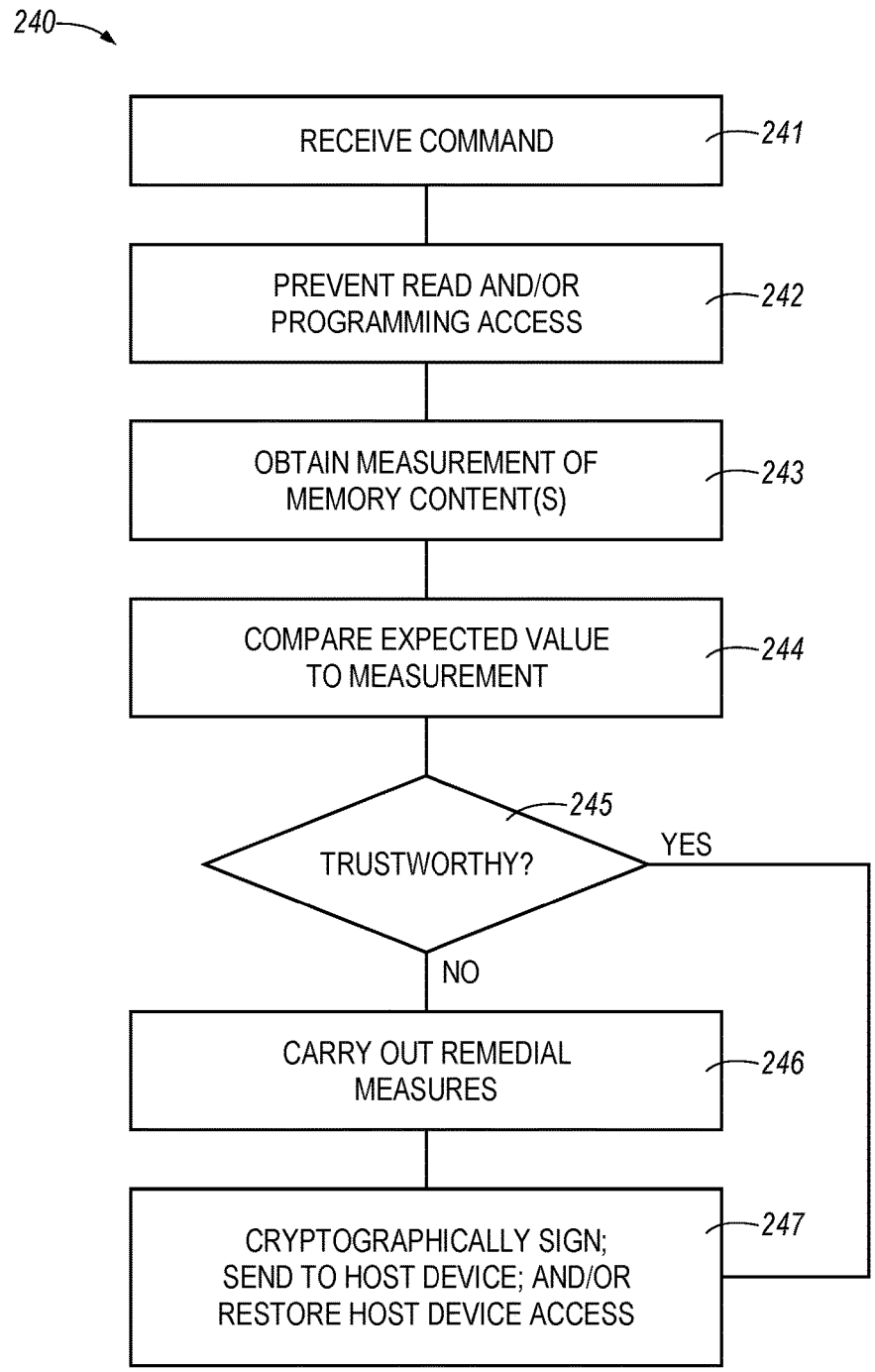
FIG. 2 is a flow diagram illustrating a routine that is executed, at least in part, by a nonvolatile memory device in accordance with an embodiment of the present technology.

FIG. 2 is a flow diagram illustrating a routine 240 that is executed, at least in part, by a memory device (e.g., memory device 100; FIG. 1) in accordance with an embodiment of the present technology. At block 241, the routine 240 starts when it receives a command (e.g., from the host device 108; FIG. 1). For example, the routine 240 can begin when it receives a power on, power off, and/or reset command from the host device 108. At block 242 and in response to the command, the memory device 100 (e.g., the controller 106; FIG. 1) prevents or blocks the host device 108 from accessing (e.g., reading and/or programming) the main memory (e.g., the startup, shutdown, and/or reset routines stored within the main memory 102; FIG. 1).

At block 243, the routine 240 instructs the memory device 100 (e.g., the controller 106 and/or the security hardware 104; FIG. 1) to measure at least a portion of its memory content. For example, the routine 240 can instruct the memory device 100 to measure the memory content of the startup, shutdown, and/or reset routines by calculating or otherwise obtaining a measured value (e.g., hash value) corresponding to the memory content. In some embodiments, the memory device 100 (e.g., the controller 106) can utilize control logic (e.g., a buffer and/or timing logic) while taking the measurement of the memory content to pipeline memory array reads into the security hardware 104. This can be useful for particularly large memory content measurements and/or when the memory data bus throughput and the security bus throughout do not align. For example, the control logic can store the current core memory address of the memory content to be measured, translate the core memory address into an address of appropriate length for the security hardware 104, and manage read timing through the SHA engine of the security hardware 104. In other embodiments, the control logic and/or components of the control logic (e.g., the buffer) can be omitted, for example, when low data throughput is acceptable and/or when the memory bus throughput and the security bus throughput align.

At blocks 244 and 245, the routine 240 compares an expected value, such as a golden hash value (e.g., stored in security registers of the security hardware 104), to the measured value obtained from the measurement of the memory content to determine whether the memory device 100 is trustworthy (e.g., whether the startup, shutdown, and/or reset routines have been unexpectedly modified or otherwise corrupted). If the routine 240 determines that the expected value and the measured value are in accord, the routine 240 can proceed to block 247 to direct the memory device 100 to cryptographically sign the measured value. In these and other embodiments, the routine 240 can direct the memory device 100 to send the signed measured value and/or other authentication information to the host device 108 over the system bus (e.g., system bus 115; FIG. 1). The routine 240 can also restore access of the main memory 102 (e.g., of the startup, shutdown, and/or reset routines) to the host device 108.

On the other hand, if the routine 240 determines that the expected value and the measured value are not in accord, the routine 240 can flag the memory device 100 (e.g., the memory content of the main memory 102) as untrustworthy and/or can proceed to carry out other remedial measures at block 246. For example, the routine 240 can access a reserved memory region of the main memory 102 (e.g., reserved memory region 112; FIG. 1) to replace the unexpectedly modified or otherwise corrupted memory content with a backup of genuine memory content (e.g., genuine routines, firmware, and/or other data) of the memory device 100 and/or of the computer system (e.g., system 101; FIG. 1).

To ensure that the backup stored in the reserved memory region 112 has not been unexpectedly modified or otherwise corrupted, the routine 240, in some embodiments, can instruct the memory device 100 (e.g., the controller 106 and/or the security hardware 104) to measure the backup of the memory content, calculate a corresponding measured value, and compare the corresponding measured value to an expected value before replacing the unexpectedly modified or otherwise corrupted memory content with the backup of the memory content stored in the reserved memory region 112. In some embodiments, the corresponding measured value of the backup of the memory content can be compared to an expected value (e.g., a value unique to the reserved memory region 112) that is different than the expected value used in the comparison at blocks 244 and 245 above. In other embodiments, the corresponding measured value of the backup of the memory content can be compared to an expected value that is equivalent (e.g., the same) as the expected value used in the comparison at blocks 244 and 245 above. If the routine 240 determines that the backup of the memory content stored in the reserved memory region 112 has itself been unexpectedly modified or otherwise corrupted, the routine 240 can perform other remedial measures. For example, the routine 240 can direct the memory device 100 to enter a safe mode and/or to send a warning to a user (e.g., a system administrator) of a potential problem. In response to this warning, the user can have the option to correct the problem or to exit out of the safe mode and ignore the warning. If the user chooses the latter, the host device 108 can request for the memory device 100 to load the untrustworthy memory content of the main memory 102. In other embodiments, the routine 240 can block the host device 108 from accessing (e.g., reading and/or programming) the untrustworthy memory content of the memory device 100 but can otherwise restore access of the main memory 102 to the host device 108. In still other embodiments, in response to read and/or programming requests from the host device 108, the memory device 100 can return static values, such as 0x00 or 0xFF, rather than the information requested by the host device 108.

Figure 3:
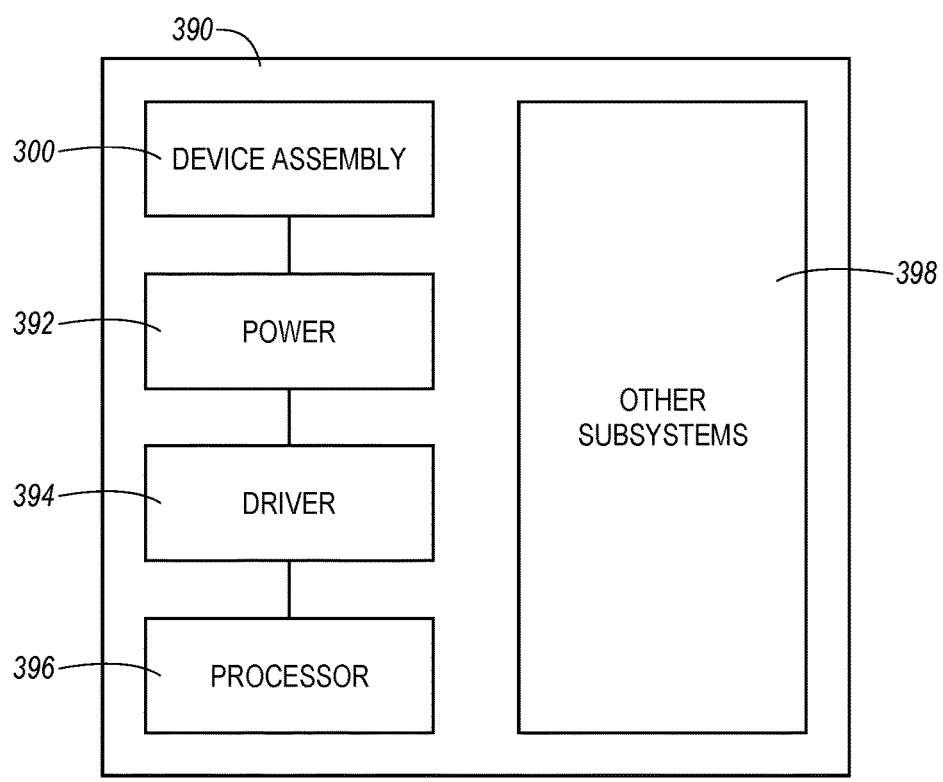
FIG. 3 is a schematic view of a system that includes a memory device in accordance with embodiments of the present technology.

FIG. 3 is a schematic view of a system that includes a memory device in accordance with embodiments of the present technology. Any one of the foregoing memory devices described above with reference to FIGS. 1-2 can be incorporated into any of a myriad of larger and/or more complex systems, a representative example of which is system 390 shown schematically in FIG. 3. The system 390 can include a semiconductor device assembly 300, a power source 392, a driver 394, a processor 396, and/or other subsystems and components 398. The semiconductor device assembly 300 can include features generally similar to those of the memory device described above with reference to FIGS. 1-2, and can, therefore, include various features of memory content authentication. The resulting system 390 can perform any of a wide variety of functions, such as memory storage, data processing, and/or other suitable functions. Accordingly, representative systems 390 can include, without limitation, hand-held devices (e.g., mobile phones, tablets, digital readers, and digital audio players), computers, vehicles, appliances, and other products. Components of the system 390 may be housed in a single unit or distributed over multiple, interconnected units (e.g., through a communications network). The components of the system 390 can also include remote devices and any of a wide variety of computer readable media.

From the foregoing, it will be appreciated that specific embodiments of the invention have been described herein for purposes of illustration, but that various modifications may be made without deviating from the disclosure. For example, the routine 240 illustrated in FIG. 2 is not limited to startup, shutdown, and/or reset routines and can be carried out to authenticate other system components and/or memory content corresponding to other hardware devices, memory, and routines. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described.

We claim:

1. A memory device comprising:
    a controller;
    a main memory operably coupled to the controller, the main memory having one or more user memory regions and at least one reserved memory region; and
    security hardware operably coupled to the controller and to the main memory, the security hardware configured to—
        measure memory content stored in the one or more user memory regions to obtain a measured value,
        compare the measured value to an expected value,
        based on the comparison, determine that the measured value and the expected value are equal, and
        based on the determination that the measured value and the expected value are equal, cryptographically sign the measured value.

2. The memory device of claim 1, wherein the controller is configured to prevent access to the main memory at least until the measured value is obtained.

3. The memory device of claim 1, wherein the security hardware includes at least one of a secure hash algorithm engine, one or more monotonic counters, and one or more security registers.

4. The memory device of claim 1, wherein the memory content is at least one of a startup routine, a shutdown routine, and a reset routine.

5. The memory device of claim 1, wherein the controller comprises the security hardware.

6. A method for authenticating genuineness of memory content in a memory device having a controller, security hardware, and a main memory, wherein the main memory includes one or more user memory regions and at least one reserved memory region, the method comprising:
    measuring memory content of the one or more user memory regions to obtain a measured value;
    comparing the measured value to an expected value using the security hardware;
    based on the comparison, determining that the measured value and the expected value are equal; and
    based on the determination that the measured value and the expected value are equal, cryptographically signing the measured value using the security hardware.

7. The method of claim 6, wherein the method further comprises preventing access to the main memory at least until the measured value is obtained.

8. The method of claim 6, wherein the memory content of the one or more user memory regions includes at least one of a startup routine, a shutdown routine, and a reset routine.

9. A memory system comprising:
    a host device; and
    a memory device including—
        a controller,
        a main memory operably coupled to the controller, the main memory having one or more user memory regions and at least one reserved memory region, and
        security hardware operably coupled to the controller and to the main memory, wherein the security hardware is configured to:
            measure memory content stored in the one or more user memory regions to obtain a measured value,
            compare the measured value to an expected value,
            based on the comparison, determine that the measured value and the expected value are equal, and
            based on the determination that the measured value and the expected value are equal, cryptographically sign the measured value.

10. The system of claim 9, wherein the controller is configured to prevent the host device from accessing the main memory at least until the measured value is obtained.

11. The system of claim 9, wherein the memory content of the plurality of memory regions includes at least one of a startup routine, a shutdown routine, and a reset routine.

12. The system of claim 9, wherein the controller comprises the security hardware.

\* \* \* \* \*